United States Patent Office 3,401,061
Patented Sept. 10, 1968

3,401,061
PROCESS FOR CLEANING THE INTERIOR OF HOLLOW, AIR-TIGHT VESSELS
Fusao Watanabe, Toyonaka, Japan, assignor to Katsuji Sanjo, Kitanagasadori, Ikutaku, Kobe, Japan
No Drawing. Filed Mar. 9, 1964, Ser. No. 350,518
3 Claims. (Cl. 134—22)

ABSTRACT OF THE DISCLOSURE

Gaseous hydrogen chloride produced inside a vessel dislodges rust from the internal surfaces thereof so that said rust can readily be removed.

---

The present invention relates to a process for cleaning the interior sides of hollow and air-tight containers with acid in the vapor phase.

Although the necessity for cleaning the interior of hollow, air-tight vessels has been in existence for a long time, and is rapidly increasing, there still is really no known satisfactory method for cleaning the insides of such vessels of adhering substances, e.g. rust, oils and fats, grease, paints, pigments, and the like.

Among the various methods suggested for the cleansing of adhering substances, such as rust, from the insides of containers, there may be mentioned the use of such devices as grinders, scrapers, etc., to mechanically scrape off the rust. This method has certain manifest defects such as limitation of space in the vessel, danger to the workers of harming their respiratory organs from the powdered rust, and the fact that it is impossible to adequately clean every part of the vessel.

There has also been used a method whereby the air-tight vessel is filled with an acid. However, this is uneconomical because of the great amount of acid necessary to adequately clean the interior of the vessel and, moreover, it is difficult to dispose of the acid safely. Among the most satisfactory of the known methods is the use of an acid in combination with adhesive, whereby the adhesive is applied to the walls and the acid is then applied so that it adheres to the adhesive. However, even this method has certain grave disadvantages such as, for example, the great cost due to the fact that adhesives of good quality are relatively expensive. Further, it is dangerous since the adhered acid drips from the ceiling.

Also, among the methods suggested for cleaning oils and fats from the interior of hollow, air-tight vessels, none have been found to be wholly satisfactory. For example, it has been suggested to emulsify the oils and fats sticking to the sides of the vessel; however, this method fails to effectively clean the vessel. There has also been used certain liquid cleaners which are applied to the walls by hand. However, this method is disadvantageous due to the limitation of space inside most vessels.

There has also been suggested circulating a liquid cleaner through the vessel; however, this method requires a bigger vessel, to hold the liquid cleanser, than the one to be cleaned and also, requires a heat exchanger and a pump for circulating the solution. These requirements make this method so expensive that it is not practical to use. Further, there is difficulty in maintaining a sufficient cleansing action together with sufficient velocity of the cleansing solvent to remove the adhering substance.

The primary object of the present invention is the embodiment of a process for the removal of adhering substances from the interior sides of hollow, air-tight vessels which does not have the disadvantages of the known prior art methods enumerated above.

Briefly stated, the present invention essentially realizes the aforementioned object by providing a method which employs cleansing materials in the vapor phase. In particular, the cleansing material, in the vapor phase, is produced inside the vessel, and the gas permeates the whole vessel by raising the temperature of the vessel and/or using a heavy concentration.

When the material to be removed from the interior of the vessel is rust, a mineral acid in the vapor phase, such as hydrogen chloride, and the like, is preferred. The vessel must be air-tight to prevent the escape of the gas to the outside. In this way a sufficient concentration of gas is built up inside the vessel to adequately remove the scale (rust) adhering to the sides of said vessel.

Inorganic compounds containing sulfur and chlorine which decompose in water to produce hydrogen chloride gas are preferred for the in situ production of hydrogen chloride. Examples of such sulfur and chlorine containing inorganic compounds are chlorosulfonic acid, thionylchloride, and sulfonyl chloride. Chlorosulfonic acid is preferred because it is relatively inexpensive.

The following examples set forth the presently preferred representative embodiments of the invention.

Example 1

An air-tight vessel having a volume of 2 cubic meters was made from an iron sheet having a thick coating of rust. An injection hole was drilled in the vessel. Through the injection hole the vessel was filled with 5 liters of water, after which there was added 500 grams of chlorosulfonic acid, thereby producing hydrochloric acid. The injection hole was plugged and the vessel was left for 24 hours at room temperature (25°–30° C.). At the end of this time, inspection of the sides showed them to be perfectly clean.

Example 2

An air-tight vessel was prepared as in Example 1. There was placed into the vessel 3 liters of sulfuric acid (96%) in an anti-acid container, and then there was slowly added thereto 4 liters of hydrochloric acid (35%), thereby producing hydrogen chloride gas. The vessel was left for 15 hours at room temperature (25°–30° C.). Examination of the vessel at the end of this time revealed that the inside of the vessel, after being washed with water, was completely free of rust.

Example 3

An air-tight vessel was prepared as in Example 1. Into the vessel there was placed 3.5 liters of a saturated sodium chloride solution in an anti-acid container, to which there was slowly added 3 kilograms of sulfuric acid (96%). The resulting reaction is as follows:

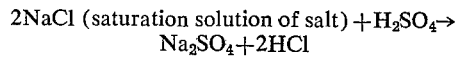

$$2NaCl \text{ (saturation solution of salt)} + H_2SO_4 \rightarrow Na_2SO_4 + 2HCl$$

The vessel was left for 24 hours at room temperature (25°–30° C.). Examination of the vessel at the end of this time revealed that the inside of the vessel, after being washed with water, was completely free of rust.

The invention and its advantages are clear from the foregoing description and it is apparent that various changes may be made in the processes without departing from the spirit and scope of the invention or sacrificing its material advantages, the processes, hereinbefore described, being merely illustrative of preferred embodiments of the invention.

Having thus disclosed the invention, what is claimed is:
 1. The method of removing rust from the interior of a hollow air-tight vessel, which comprises mixing, inside the vessel, water and an inorganic compound containing sulphur and chlorine and capable of releasing hydrogen chloride gas, the amount of the said inorganic compound being sufficient to produce hydrogen chloride gas in an amount such that the hydrogen chloride gas contacts the rust adhering to the interior of said vessel and dislodges the same from the vessel, and removing the dislodged rust from the vessel.

2. The method as claimed in claim 1 wherein the inorganic compound is chlorosulfonic acid.

3. The method of removing rust from the interior of a hollow, air-tight vessel, which comprises mixing, inside said vessel, sulfuric acid with a member selected from the group consisting of hydrochloric acid and an inorganic chloride salt, thereby producing hydrogen chloride gas in an exothermic reaction, the hydrogen chloride gas coming in contact with said rust and dislodging same, and removing said rust.

References Cited

UNITED STATES PATENTS

| | | | |
|---|---|---|---|
| 1,225,956 | 5/1917 | Hoffman | 134—41 X |
| 1,532,789 | 4/1925 | Vollrath | 134—36 X |
| 1,832,697 | 11/1931 | Freeman | 134—31 X |
| 2,532,299 | 12/1950 | Greco | 134—22 X |
| 2,565,137 | 8/1951 | Kronquest | 134—3 |
| 2,608,980 | 9/1952 | Snyder et al. | 134—3 |
| 2,714,079 | 7/1955 | Stodgell | 134—22 |
| 2,856,333 | 10/1958 | Topelain. | |
| 3,084,076 | 4/1963 | Loucks | 134—22 |

FOREIGN PATENTS

| | | |
|---|---|---|
| 297,605 | 4/1917 | Germany. |
| 1,052,915 | 3/1959 | Germany. |

MORRIS O. WOLK, *Primary Examiner.*

J. ZATARGA, *Assistant Examiner.*